J. F. ROUSTON.
SHAFT SPRING.
APPLICATION FILED AUG. 21, 1908.
946,274.
Patented Jan. 11, 1910.
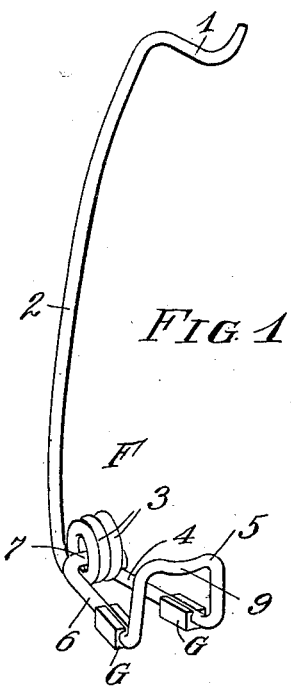
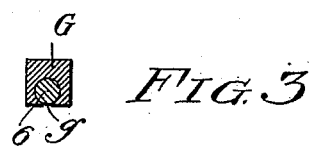
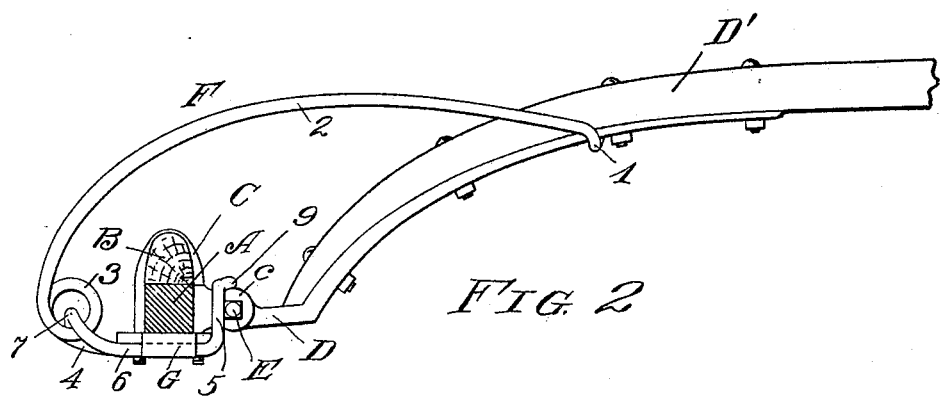
WITNESSES:
Brennan B. West.
Nathan F. Fretter.
INVENTOR,
John F. Rouston,
By Bates, Fouts & Hull,
ATTYS.

UNITED STATES PATENT OFFICE.

JOHN F. ROUSTON, OF CLEVELAND, OHIO.

SHAFT-SPRING.

946,274.  Specification of Letters Patent.  Patented Jan. 11, 1910.

Application filed August 21, 1908. Serial No. 449,597.

*To all whom it may concern:*

Be it known that I, JOHN F. ROUSTON, a citizen of the United States, residing at Cleveland, in the county of Cuyahoga and State of Ohio, have invented a certain new and useful Improvement in Shaft-Springs, of which the following is a full, clear, and exact description, reference being had to the accompanying drawings.

It is the purpose of my invention to provide an adjustable spring for the shafts of wagons and vehicles so as to relieve the weight and jar of the shafts on the horse's back when in use, also to hold the shafts at any desired angle when not in use. I accomplish this by providing a spring which hooks over the ears to which the shaft is secured, passes beneath the axle and then up over the axle and engages beneath the shaft some distance in front of the pivot thereof, there being adjustable blocks where the spring passes beneath the axle to give the spring proper tension and hold the shaft at the desired angle.

The invention is hereinafter more fully described and its essential characteristics set out in the claims.

In the drawings, Figure 1 is a perspective view of the spring when not in use showing the adjusting sleeves out of action; Fig. 2 is a side elevation of the spring and a portion of the vehicle to which it is applied; in this view the adjusting sleeves are in position to take up the maximum space; Fig. 3 is a detail in cross section of the spring through one of the adjusting sleeves.

As shown in Fig. 2, A represents the axle proper and B the surmounting axle frame. C indicates the shackle passing over the frame and secured by a plate and nuts beneath the axle. On the forward side of the shackle C are the ears $c$ between which are pivoted the straps D extending rearwardly from the shafts D', a suitable bolt E acting as a pivot pin. This is simply illustrative of the usual construction.

My spring is indicated by F. It is made in one integral piece and comprises a portion 1 adapted to hook under the shaft, then a portion 2 extending to the rear of the axle, then several coils 3, then a portion 4 extending beneath the axle, then a portion 5 extending up from the ears $c$ and down on the other side of them, then a portion 6 extending beneath the axle and a portion 7 turning through the coil 3. On the two portions 4 and 6 which pass beneath the axle are adjusting sleeves G. These sleeves are suitable blocks, preferably square or rectangular in cross section, with the opening through which the spring passes located eccentrically. At one portion, as shown at $g$, the bore of the block connects with the outside through a slot. The block is preferably a malleable casting, which enables it to be hammered around the spring after the spring has been coiled. By having the opening through the sleeve G eccentric, the sleeve is adapted to take up varying amounts of play between the spring and the under side of the axle. With the sleeves in the position shown in Fig. 1, they are practically idle. If they are turned the other side up, they take up the maximum play; if they are turned a quarter way around in either direction, they take up intermediate amounts.

It is to be understood that my spring is put in place by removing the shaft pin E, the loop of the spring being passed over the ears $c$. By adjusting the sleeves on the spring, it may not only be fitted to any axle but it is adapted to hold the shaft at any desired angle.

My spring is not only very simple and cheap in construction, but practice has demonstrated it to be very efficient in service. It is durable, and does not wear the shaft or shackle. I am aware that it has been proposed to support the shafts by a spring which passes over onto the rear side of the axle and then forwardly beneath it, but such springs with which I am familiar have been secured at their front end by passing between the shackle ears, thus pressing forwardly on the shaft joint and causing undue wear on the pivot pin. Moreover, in order to enable the spring to pass between the shackle and shaft eye, the spring must be made unduly thin, so that it breaks.

So far as I am aware, I am the first to provide a spring which passes over the shackle ears as well as to provide a spring which has adjusting members to adapt it to vehicles whether the shackle ears be placed high or low upon the axle, thus always giving the spring the proper tension. My spring not only serves to hold the shafts elevated, but is so formed as to contact with the shaft eye, as shown at 9, and thereby prevents rattling.

I claim:

1. A shaft spring made of one continuous piece of metal and having the following portions in order, namely: a hooked portion to engage beneath the shaft, a comparatively long reach to extend behind the axle, a single series of coils, a portion extending from the last coil beneath the axle to the front thereof, a portion extending in a loop and adapted to pass over the shackle ears, and a portion extending from such loop beneath the axle and turned into the coil.

2. A shaft spring made of one continuous piece of metal and having the following portions in order, namely: a hooked portion to engage beneath the shaft, a comparatively long reach to extend behind the axle, a single series of coils, a portion extending from the last coil beneath the axle to the front thereof, a portion extending in a loop and adapted to pass over the shackle ears, and a portion extending from such loop beneath the axle and turned into the coil, the looped portion of which extends over the ears being depressed intermediately to engage the shaft eye.

3. A shaft spring made of one continuous piece of metal and having the following portions in order, namely: a hooked portion to engage beneath the shaft, a comparatively long reach to extend behind the axle, a plurality of coils, a portion extending from the last coil beneath the axle to the front thereof, a portion extending in a loop and adapted to pass over the shackle ears, a portion extending from such loop beneath the axle and turned into the coil, and sleeves surrounding the two portions of the spring which lie beneath the axle, said sleeves having a plurality of faces at varying distances from the spring.

4. A shaft spring formed of a continuous piece of metal and adapted to engage the shaft and pass rearwardly over the axle and then beneath the axle and upwardly in a loop over the shackle ears and rearwardly from the lower end of such loop, again beneath the axle and two sleeves with flattened sides eccentrically mounted on the portions of the spring which pass beneath the axle, said sleeves being formed with recesses, the walls of which are forced over the spring to hold the sleeves in place.

5. A shaft spring having a portion which bears on the top of coupling ears or lugs and adapted to contact with the shaft eye from above thereby forming an anti-rattler, a portion of said spring extending beneath the axle, sleeves upon said portion of the spring bearing against the axle for the purpose specified.

6. A shaft spring having a portion which passes beneath the axle, a sleeve formed with a recess, the walls of which are forced over the spring to hold the sleeve in place, said sleeve having faces at varying distances from the axis upon which it is mounted so as to provide an adjustment between the spring and the axle.

In testimony whereof, I hereunto affix my signature in the presence of two witnesses.

JOHN F. ROUSTON.

Witnesses:
A. J. HUDSON,
BRENNAN B. WEST.